(12) United States Patent
Craig et al.

(10) Patent No.: US 10,118,520 B2
(45) Date of Patent: Nov. 6, 2018

(54) VENTILATION DEVICE FOR A VEHICLE SEAT ASSEMBLY

(71) Applicant: Kongsberg Automotive, Inc., Novi, MI (US)

(72) Inventors: Benjamin Craig, Farmington, MI (US); Zachary Abbott, East Lansing, MI (US); Robert Case, South Lyon, MI (US); Douglas Wheeler, Farmington Hills, MI (US)

(73) Assignee: Kongsberg Automotive, Inc., Novi, MI (US)

( * ) Notice: Subject to any disclaimer, the term of this patent is extended or adjusted under 35 U.S.C. 154(b) by 330 days.

(21) Appl. No.: 15/184,169

(22) Filed: Jun. 16, 2016

(65) Prior Publication Data

US 2017/0361742 A1    Dec. 21, 2017

(51) Int. Cl.
*B60N 2/68* (2006.01)
*B60N 2/56* (2006.01)

(52) U.S. Cl.
CPC .......... *B60N 2/5657* (2013.01); *B60N 2/5635* (2013.01); *B60N 2/5642* (2013.01)

(58) Field of Classification Search
CPC ........... B60N 2/5657; B60N 2/58; B60N 2/68
USPC ............ 297/180.14, 180.11, 452.42, 452.43, 297/180.16
See application file for complete search history.

(56) References Cited

U.S. PATENT DOCUMENTS

| 4,561,441 A | * | 12/1985 | Kolodziej | A47C 4/54 297/180.11 |
| 5,403,065 A | * | 4/1995 | Callerio | A47C 7/74 297/180.11 |
| 6,003,950 A | * | 12/1999 | Larsson | A47C 7/74 297/180.13 |

(Continued)

FOREIGN PATENT DOCUMENTS

| DE | 19805174 C1 | 6/1999 |
| DE | 19941715 C1 | 11/2000 |

(Continued)

OTHER PUBLICATIONS

English language abstract and computer-generated English translation for DE19805174 extracted from espacenet.com database Sep. 19, 2016, 7 pages.

(Continued)

*Primary Examiner* — Syed A Islam
(74) *Attorney, Agent, or Firm* — Howard & Howard Attorneys PLLC

(57) ABSTRACT

A vehicle seat assembly comprises a seat bottom having a bottom cushion, a seat back coupled to the seat bottom with the seat back having a back cushion, and at least one of the bottom cushion and the back cushion having a passage. The assembly further includes a flow control layer coupled to the cushion having the passage with the flow control layer defining a first support area having a first plurality of slits and a second support area, adjacent to the first support area, having a second plurality of slits. Each slit defines a width that is moveable between a restricted position and a free-flowing position. The width of the first slits can move to the free-flowing position while the width of the second slits remains in the restricted position when the first support area receives a first load for flowing air through the first slits and the passage.

26 Claims, 9 Drawing Sheets

(56) References Cited

U.S. PATENT DOCUMENTS

| | | | | |
|---|---|---|---|---|
| 6,109,688 | A | * | 8/2000 | Wurz ................... A47C 7/744 297/180.13 |
| 6,578,910 | B2 | | 6/2003 | Andersson et al. |
| 6,629,724 | B2 | | 10/2003 | Ekern et al. |
| 6,840,576 | B2 | | 1/2005 | Ekern et al. |
| 6,893,086 | B2 | | 5/2005 | Bajic et al. |
| 7,040,710 | B2 | | 5/2006 | White et al. |
| 7,052,091 | B2 | | 5/2006 | Bajic et al. |
| 7,100,978 | B2 | | 9/2006 | Ekern et al. |
| 7,197,801 | B2 | | 4/2007 | Bajic et al. |
| 7,370,911 | B2 | | 5/2008 | Bajic et al. |
| 7,425,034 | B2 | | 9/2008 | Bajic et al. |
| 7,478,869 | B2 | | 1/2009 | Lazanja et al. |
| 7,578,552 | B2 | | 8/2009 | Bajic et al. |
| 7,588,288 | B2 | | 9/2009 | Bajic et al. |
| 7,637,573 | B2 | | 12/2009 | Bajic et al. |
| 7,735,932 | B2 | | 6/2010 | Lazanja et al. |
| 7,775,602 | B2 | | 6/2010 | Lazanja et al. |
| 7,918,498 | B2 | * | 4/2011 | Bajic ...................... A47C 7/72 297/180.1 |
| 8,360,517 | B2 | | 1/2013 | Lazanja et al. |
| 8,820,829 | B2 | | 9/2014 | Uebelacker |
| 8,881,328 | B2 | | 11/2014 | Mikkelsen et al. |
| 2006/0249996 | A1 | | 11/2006 | Eberl et al. |
| 2007/0063551 | A1 | | 3/2007 | Gasic et al. |
| 2007/0176471 | A1 | | 8/2007 | Knoll |
| 2008/0191521 | A1 | | 8/2008 | Bajic et al. |
| 2008/0244832 | A1 | * | 10/2008 | Kuo ...................... A47C 7/021 5/638 |
| 2015/0079892 | A1 | | 3/2015 | Bauer et al. |
| 2015/0274049 | A1 | | 10/2015 | Langensiepen et al. |
| 2015/0329027 | A1 | | 11/2015 | Axakov |

FOREIGN PATENT DOCUMENTS

| | | |
|---|---|---|
| DE | 20319093 U1 | 5/2005 |
| DE | 20 2007 001409 U1 | 8/2007 |
| DE | 102006051703 A1 | 5/2008 |
| DE | 202013006135 U1 | 7/2013 |
| EP | 0959734 B1 | 4/2001 |
| EP | 2423040 A2 | 2/2012 |
| EP | 2626239 A1 | 8/2013 |
| EP | 1813471 B1 | 1/2014 |

OTHER PUBLICATIONS

English language abstract and computer-generated English translation for DE19941715 extracted from espacenet.com Sep. 19, 2016, 6 pages.

English language abstract and computer-generated English translation for DE20319093 extracted from espacenet.com database Sep. 19, 2016, 6 pages.

English language abstract and computer-generated English translation for DE102006051703 extracted from espacenet.com database Sep. 19, 2016, 6 pages.

English language abstract for EP1813471 extracted from espacenet.com database Sep. 19, 2016, 1 page.

English language abstract and machine-assisted English language translation of German publication DE 20 2007 001409 extracted from www.espacenet.com on Dec. 15, 2017; 7 pages.

International Search Report for International Patent Application No. PCT/US2017/048448 dated Nov. 24, 2017; 11 pages.

* cited by examiner

VENTILATION DEVICE FOR A VEHICLE SEAT ASSEMBLY

TECHNICAL FIELD

The subject invention relates generally to a vehicle seat assembly comprising one or more ventilation devices having a flow control layer for efficiently flowing air directly about an occupant, while reducing or preventing airflow along other directions.

SUMMARY OF THE DISCLOSURE

One example of the present invention provides a vehicle seat assembly comprising a seat bottom having a bottom cushion and a seat back, which has a back cushion and is coupled to the seat bottom. At least one of the bottom cushion and the back cushion defines a passage, and the vehicle seat assembly further comprises at least one flow control layer coupled to a corresponding one of the cushions having the passage. The flow control layer comprises a first support area defining a first plurality of slits and a second support area, adjacent to the first support area, defining a second plurality of slits. Each one of the first plurality of slits and the second plurality of slits has a pair of opposing edges defining a width therebetween. The width of the first plurality of slits and the second plurality of slits are moveable between a restricted position and a free-flowing position. More specifically, the width of the first plurality of slits can move to the free-flowing position while the width of the second plurality of slits remains in the restricted position when the first support area receives a first load for flowing air through the first plurality of slits and the passage.

BRIEF DESCRIPTION OF THE DRAWINGS

Advantages of the present invention will be readily appreciated as the same becomes better understood by reference to the following detailed description when considered in connection with the accompanying drawings.

DETAILED DESCRIPTION

Referring to the Figures, wherein like numerals indicate like or corresponding parts throughout the several views, a vehicle seat assembly 100 having two ventilation devices 102, 104 comprising a corresponding one of two flow control layers 106, 108 in accordance with one exemplary embodiment is generally shown. In other embodiments, the vehicle seat assembly can include more or fewer than two ventilation devices and corresponding flow control layers. Each flow control layer 106, 108 defines a plurality of slits that selectively flow air directly about an occupant while reducing or preventing airflow along any number of directions, which are spaced apart from the occupant, such that the ventilation device provides efficient and direct ventilation of the occupant.

Figure 1:
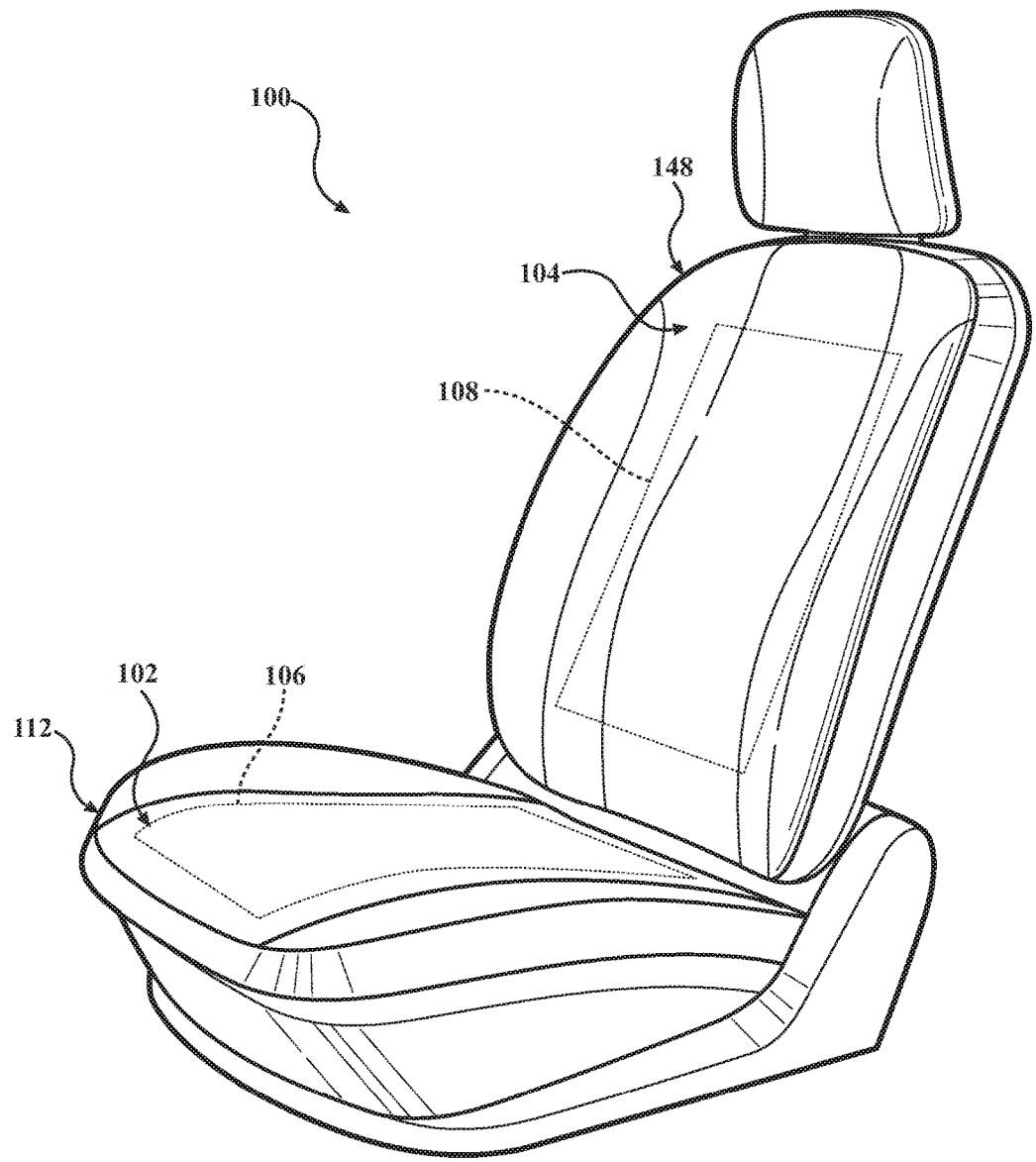
FIG. 1 is a perspective view of a first embodiment of a vehicle seat assembly having a seat bottom and a seat back coupled to one another.
Figure 2A:
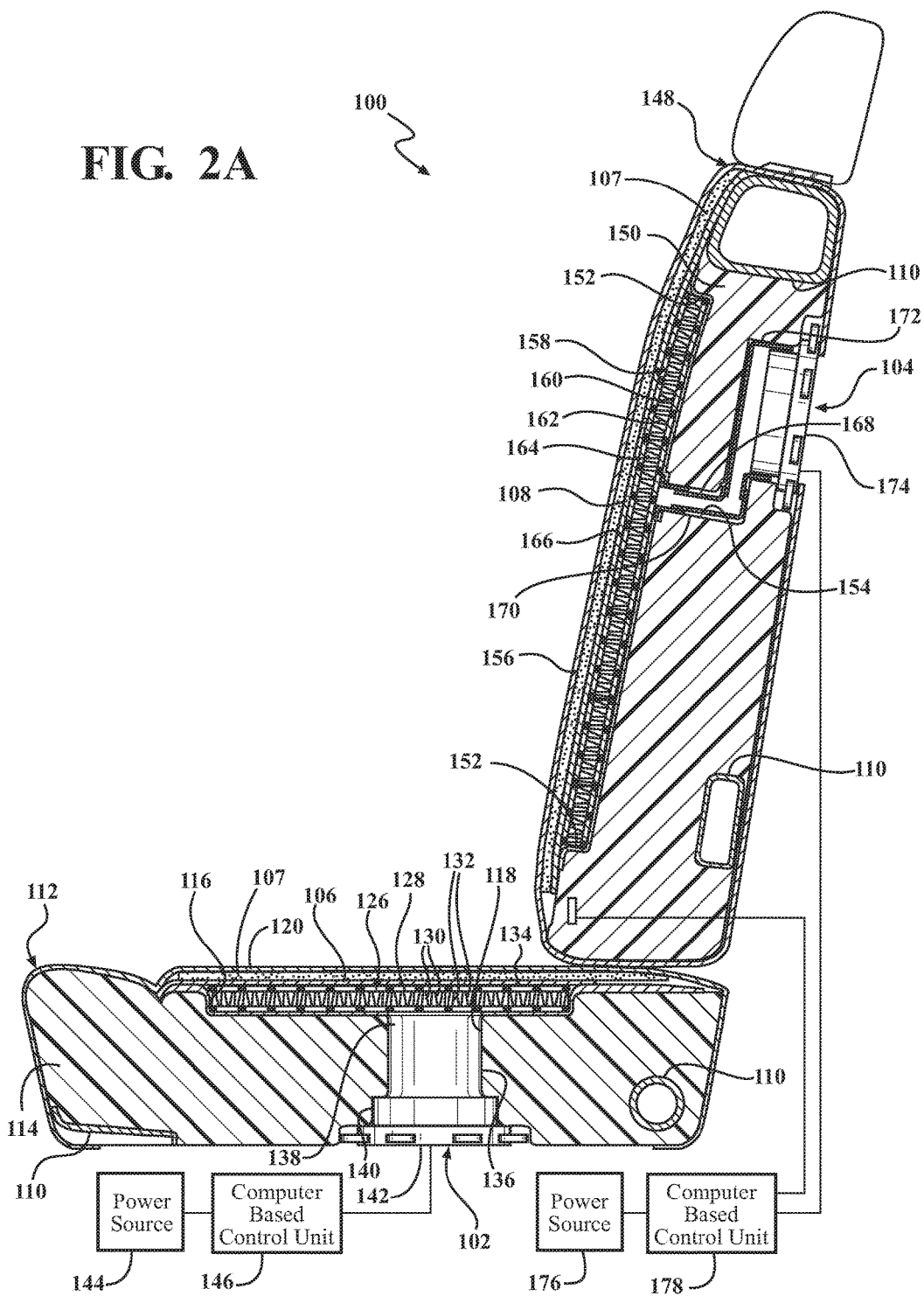
FIG. 2A is a cross-sectional view of the vehicle seat assembly of FIG. 1, illustrating each one of the seat bottom and the seat back having a ventilation device, with each ventilation device including a flow control layer and one spacer mesh disposed adjacent to a Class A surface or seat cover that supports a vehicle seat occupant.

Referring to FIGS. 1 and 2A, the vehicle seat assembly 100 can comprise a frame 110 and a seat bottom 112, which comprises a bottom cushion 114 coupled to the frame 110. In this embodiment, the bottom cushion 114 is a foam padding. However, the bottom cushion can be comprised of any suitable material. The bottom cushion 114 defines a passage 116 and a center hole 118 for communicating with the same. The seat bottom 112 further comprises a seat cover 120 or Class A surface, which is comprised of a layer of permeable material that surrounds the bottom cushion 114.

Figure 3:
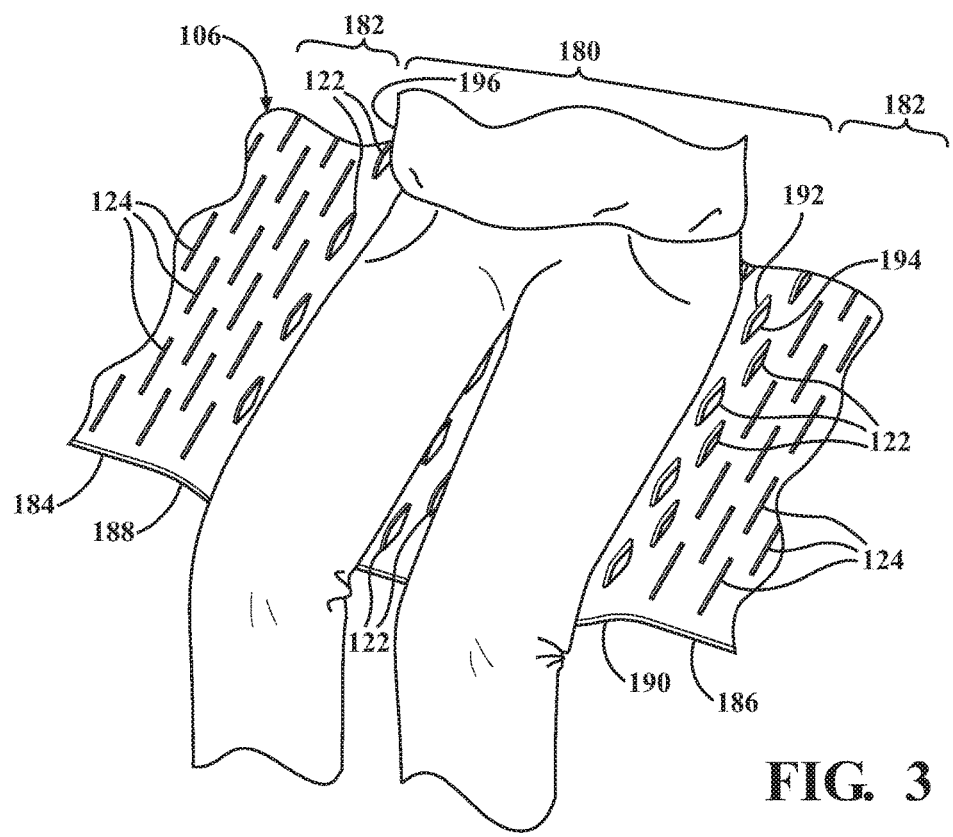
FIG. 3 is a perspective cutaway view of a portion of the flow control layer of FIG. 2, with all other components of the ventilation device and vehicle seat assembly being removed for illustration purposes only, with the flow control layer comprising a first support area that defines a first plurality of slits and a second support area, adjacent to the first support area, defining a second plurality of slits, and the width of each one of the first plurality of slits moving to a free-flowing position while the second plurality of slits remain in a restricted position to reduce airflow that does not communicate with a first occupant when the first support area receives a first load corresponding with the first occupant.
Figure 4:
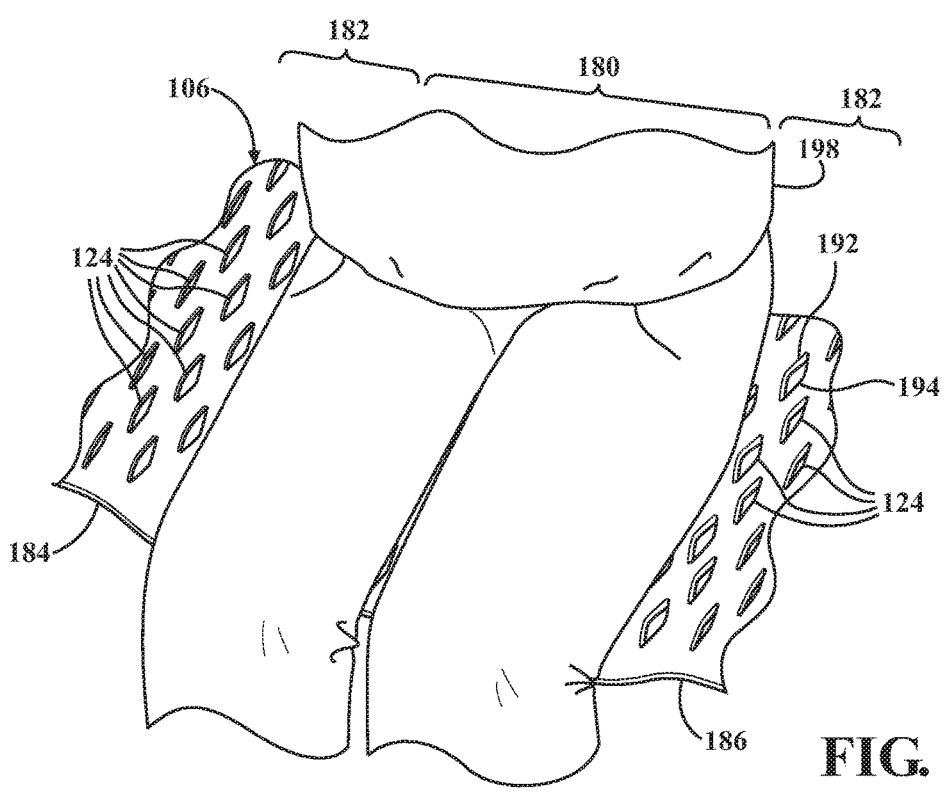
FIG. 4 is a perspective cutaway view of the portion of flow control layer of FIG. 3, illustrating that the second plurality of slits can move to a free-flowing position when the second support area receives a second load corresponding with a second occupant, who is wider and heavier than the first occupant.

The vehicle seat assembly 100 further comprises the ventilation device 102, which includes the flow control layer 106 mounted about the bottom cushion 114 and underneath the seat cover 120. As shown in FIGS. 3 and 4, the flow control layer 106 defines a first plurality of slits 122 and a second plurality of slits 124, which can fluidly communicate with the permeable seat cover 120. When an occupant is seated on the seat bottom 112, at least a portion of these slits 122, 124 fluidly communicates with the seat cover 120 to cool the seat bottom 112. The flow control layer 106 will be described in detail with reference to FIGS. 3 through 14 below.

The ventilation device 102 can further include one or more spacer meshes 126 for distributing the flow of air and supporting a Class A surface of the seat bottom 112. In this example, the spacer mesh 126 can be disposed proximal to the Class A surface or seat cover 120. More specifically, the spacer mesh 126 can be received within the passage 116 of the bottom cushion 114 such that the spacer mesh 126 can support the flow control layer 106 and fluidly communicate with the first plurality of slits 122 and the second plurality of slits 124, which in turn fluidly communicate with the permeable seat cover 120. In one embodiment, the spacer mesh 126 can have honeycomb support structure 128 comprising a shape complementary with the passage 116 formed in the bottom cushion 114 adjacent to the permeable seat cover 120. The honeycomb support structure 128 can be a three-dimensional mesh-like structure formed from one or more connected strands 130 of fiber or other flexible/ductile materials having a series of large voids 132 formed therebetween. The voids 132 are large enough to not significantly affect the flow of air through the passage 116 to the first plurality of slits 122 and the second plurality of slits 124 and through the permeable seat cover 120 for efficiently cooling an occupant seated on the seat bottom 112.

In certain embodiments, the honeycomb support structure 128 has a top surface 134 that is substantially coplanar with the bottom cushion 114. Moreover, the strands 130 are oriented and otherwise configured such that the honeycomb support structure 128 provides a level of resiliency and strength to allow the honeycomb support structure 128 to compress in a similar manner to the portion of the bottom cushion 114 as an occupant is seated upon the seat bottom 112 and recover to its original shape after an occupant is unseated from the seat bottom 112. Moreover, in the compressed state (i.e. when the seat bottom 112 is occupied), the depth and width of the passage 116 are substantially maintained to allow sufficient air to be drawn through the passage 116 to cool an occupant seated on the seat bottom 112. While the spacer mesh 126 and the passage 116 have complementary rectangular shapes extending across the seat bottom 112, it is contemplated that the spacer mesh and the passage can have any suitable complementary non-rectangular shapes that extend across a portion or entirety of the seat bottom. It is further contemplated that other embodiments of the ventilation device may not include a spacer mesh when, for example, the flow control layer is supported by integral reinforcements, or other separate layers, cushions, or other support elements.

The ventilation device 102 further comprises a conduit 136, which is mounted about the bottom cushion 114 and comprises a pair of opposing ends 138, 140, including one end 138 fluidly communicating with the passage 116. In this embodiment, the conduit 136 is disposed within the center hole 118 of the bottom cushion 114. However, it is contemplated that the conduit can be mounted about the bottom cushion 114 in any other suitable arrangement.

The ventilation device 102 further comprises a fan 142, which is mounted about the bottom cushion 114 and fluidly communicates with the opposite end 140 of the conduit 136. Preferably, the size of the fan 142, in conjunction with the width, depth and number of passages 116, as well as the permeability of the seat cover 120, the range of permeability of the flow control layer 106, and the inner diameter of the conduit 136, are collectively configured to allow sufficient air to flow from the seat cover 120, through the flow control layer 106, the passage 116, and the conduit 136 to cool the seat cover 120 of the seat bottom 112 when the fan 142 is activated. The fan 142, in certain embodiments and as shown in FIG. 2, is connected to a power supply unit 144 which delivers power to the fan 142. In certain embodiments, the power supply unit 144 may also include a computer-based control unit 146 that controls the power supplied from the power supply unit 144 to the fan 142 to control the ventilation of the seat bottom 112.

In certain other embodiments, the seat bottom 120 can further include one or more additional intermediate layers disposed between any adjacent pair from the group of the seat cover, the flow control layer, the spacer mesh, and the bottom cushion. As one example, intermediate layer can be comprised of foam padding or other suitable materials. Furthermore, the seat cover, the flow control layer, the spacer mesh, and the bottom cushion can be arranged in any suitable order. As but one example, the flow control layer can be disposed between the spacer mesh and the bottom cushion.

Figure 2B:
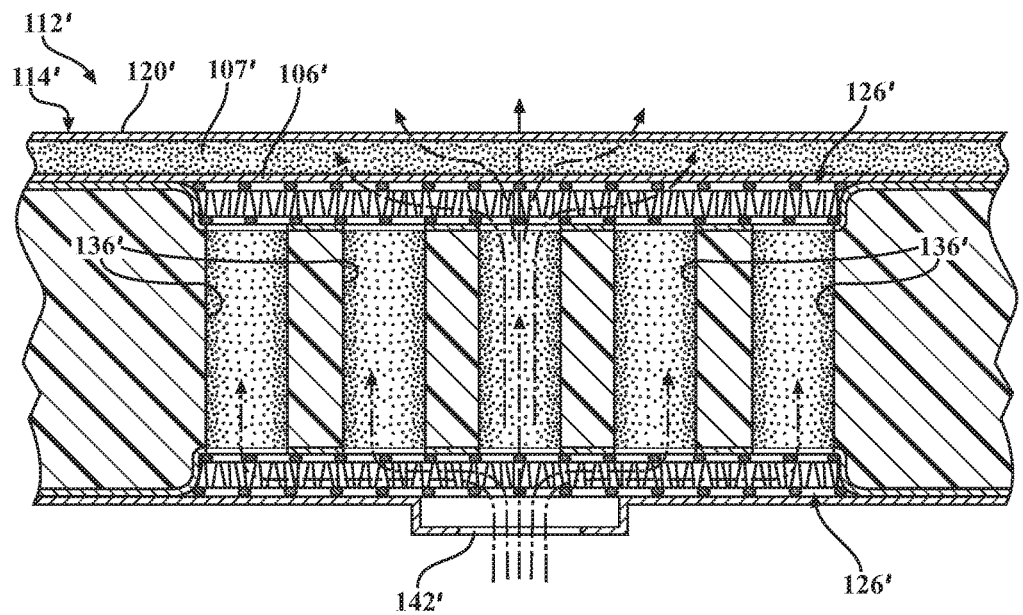
FIG. 2B is a cross-sectional view of another embodiment of the vehicle seat assembly of FIG. 2A, illustrating only a portion of the seat bottom having a pair of opposing sides with the ventilation device including a flow control layer and two spacer meshes disposed on a corresponding one of the two opposing sides.

Referring to FIG. 2B, another embodiment of a seat bottom 112' is similar to the seat bottom 112 of FIG. 2A and includes the same components identified by the same reference numbers followed by a single prime ('). While the seat bottom 112 of FIG. 2A includes only one conduit 136, the seat bottom 112' includes a plurality of conduits 136' for communicating the Class A surface and the Class B surface with one another. Furthermore, while the seat bottom 112 of FIG. 2A includes only one spacer mesh 126, the seat bottom 112' includes two spacer meshes 126' disposed on a corresponding one of two opposing sides of the bottom cushion 114'. In particular, one spacer mesh 126' can be disposed proximal to the seat cover 120' or Class A surface, and the other spacer mesh 126' can be disposed proximal to the Class B surface that is distal to the seat cover 120'. Furthermore, the seat bottom 112' further includes a foam padding layer 107' sandwiched between the seat cover 120' and the flow control layer 106'. One non-limiting benefit of this configuration of the spacer meshes 126' and the conduits 136' is that the flow of air can be evenly distributed across the flow control layer 106'. However, this exemplary seat bottom 112' can provide various other suitable benefits.

Figure 2C:
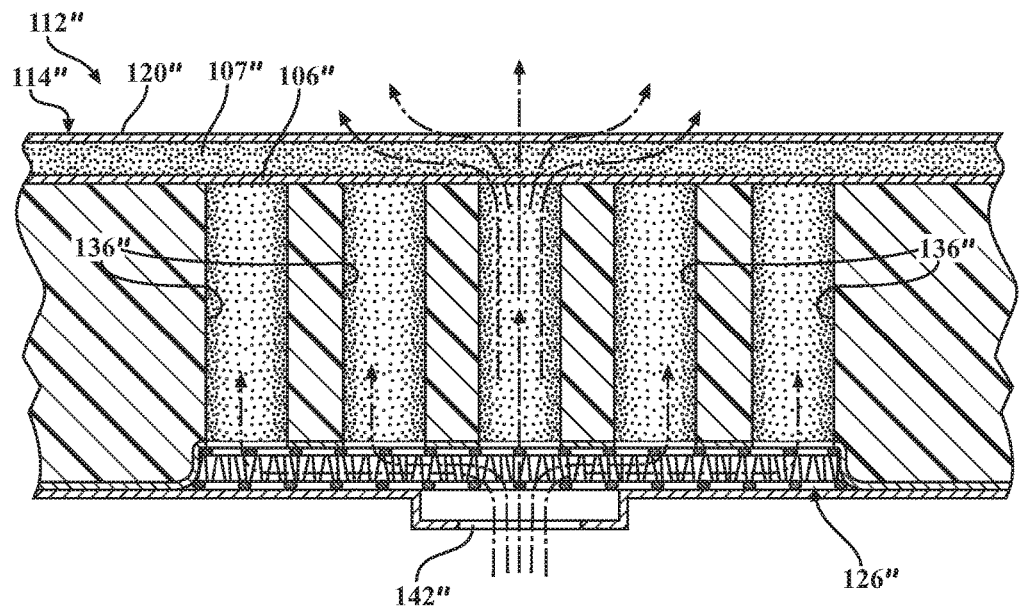
FIG. 2C is a cross-sectional view of yet another embodiment of the vehicle seat assembly of FIG. 2A, illustrating only a portion of the seat bottom with the ventilation device including a flow control layer and only one spacer mesh disposed adjacent to the Class B surface opposite to the Class A surface or seat cover that supports the vehicle seat occupant.

Referring to FIG. 2C, still another embodiment of a seat bottom 112" is similar to the seat bottom 112 of FIG. 2A and includes the same components identified by the same reference numbers followed by a double prime ("). While the seat bottom 112 of FIG. 2A includes only one conduit 136, the seat bottom 112" includes a plurality of conduits 136" for communicating the Class A surface and the Class B surface with one another. Moreover, while the seat bottom 112 of FIG. 2A includes only one spacer mesh 126 disposed adjacent to the Class A surface or seat cover 120, the seat bottom 112' includes only one spacer meshes 126" that is disposed adjacent to the Class B that is distal to the seat cover 120'. Furthermore, the seat bottom 112" further includes a foam padding layer 107" sandwiched between the seat cover 120" and flow control layer 106". One non-limiting benefit of this configuration of the spacer mesh 126" and the conduits 136" is that the flow of air can be evenly distributed across the flow control layer 106". However, this exemplary seat bottom 112" can provide other suitable benefits. It is contemplated that any portion of the seat bottom or other component of the vehicle seat assembly can have any number of spacer meshes.

The vehicle seat assembly 100 further comprises a seat back 148 and the ventilation device 104 mounted about the seat back 148. The seat back 148 is coupled to the frame 110, such that the seat bottom 112 and the seat back 148 are indirectly coupled to one another by the frame 110. In this embodiment, the seat back 148 includes a back cushion 150, which is comprised of foam padding. However, the back cushion can be comprised of any suitable material. The back cushion 150 defines a passage 152 and a center hole 154 for communicating with the same. The seat back 148 further comprises a seat cover 156 or Class A surface, which is comprised of a layer of permeable material that surrounds the back cushion 150.

The vehicle seat assembly 100 further comprises the ventilation device 104, which includes the flow control layer 108 mounted about the back cushion 150 and underneath the seat cover 156. As described in detail with reference to FIGS. 3 through 14, the flow control layer 108 defines a first plurality of slits and a second plurality of slits, which can fluidly communicate with the permeable seat cover 120 for cooling an occupant seated against the seat back 148. When an occupant is seated against the seat back 148, at least a portion of these slits fluidly communicates with the seat cover 156 for cooling an occupant seated against the seat back 148.

Similar to the ventilation device 102, the ventilation device 104 can further include one or more spacer meshes 158 for distributing the flow of air and supporting the Class A surface of the seat back 148. In this example, the spacer mesh 158 can be disposed proximal to the Class A surface or seat cover 156. The spacer mesh 158 can be received within the passage 152 of the back cushion 150 such that the spacer mesh 158 can support the flow control layer 108 and fluidly communicate with the first plurality of slits and the second plurality of slits, which in turn fluidly communicate with the permeable seat cover 156. In one embodiment, the spacer mesh 158 can have honeycomb support structure 160 comprising a shape complementary with passage 152 formed in the back cushion 150 adjacent to the permeable seat cover 156. The honeycomb support structure can be a three-dimensional mesh-like structure formed from one or more connected strands 162 of fiber or other flexible/ductile materials having a series of large voids 164 formed therebetween. The voids 164 are large enough to not significantly affect the flow of air through the passage 152 to the first plurality of slits and the second plurality of slits and through the permeable seat cover 156 for efficiently cool an occupant seated against the seat back 148.

In certain embodiments, the honeycomb support structure 160 has a top surface 166 that is substantially coplanar with the back cushion 150. Moreover, the strands 162 are oriented and otherwise configured such that the honeycomb support structure 160 provides a level of resiliency and strength to allow the honeycomb support structure 160 to compress in a similar manner to the portion of the back cushion 150 as an occupant is seated against the seat back 148 and recover to its original shape after an occupant is unseated from the seat back 148. Moreover, in the compressed state (i.e. when the seat back 148 is occupied), the depth and width of the passage 152 are substantially maintained to allow sufficient air to be drawn through the passage 152 for cooling an occupant seated against the seat back 148. While the spacer mesh 158 and the passage 152 have complementary rectangular shapes extending across the seat back 148, it is contemplated that the spacer mesh and the passage can have any suitable complementary non-rectangular shapes that extend across a portion or entirety of the seat back. It is further contemplated that other embodiments of the ventilation device may not include a spacer mesh when, for example, the flow control layer is supported by integral reinforcements, or other separate layers, cushions, or other support elements.

The ventilation device 104 further comprises a conduit 168, which is mounted about the back cushion 150 and comprises a pair of opposing ends 170, 172, including one end 170 fluidly communicating with the passage 152. In this embodiment, the conduit 168 is disposed within the center hole 154 of the back cushion 150. However, it is contemplated that the conduit can be mounted about the back cushion 150 in any other suitable arrangement The ventilation device 104 further comprises a fan 174, which is mounted about the back cushion 150 and fluidly communicates with the opposite end 172 of the conduit 168. Preferably, the size of the fan 174, in conjunction with the width, depth and number of passages 152, as well as the permeability of the seat cover 156, the range of permeability of the flow control layer 108, and the inner diameter of the conduit 168, are collectively configured to allow sufficient air to flow from the seat cover 156, through the flow control layer 108, the passage 152, and the conduit 168 for cooling an occupant seated against the seat back 148 when the fan 174 is activated. The fan 174, in certain embodiments and as shown in FIG. 2, is connected to a power supply unit 176 which delivers power to the fan 174. In certain embodiments, the power supply unit 176 may also include a computer-based control unit 178 that controls the power supplied from the power supply unit 176 to the fan 174 to control the ventilation of the seat back 138.

In other embodiments, the seat back can further include one or more additional or intermediate layers disposed between any adjacent pair from the group of the seat cover, the flow control layer, the spacer mesh, and the back cushion. This intermediate layer can be comprised of foam padding or other suitable materials. Furthermore, the seat cover, the flow control layer, the spacer mesh, and the back cushion can be arranged in any suitable order. As one example, the flow control layer can be disposed between the spacer mesh and the back cushion.

For illustrative purposes only, FIGS. 3 and 4 show only a portion of the flow control layer 106 of the ventilation device, with all other components of the ventilation device and the vehicle seat assembly being removed. The flow control layer 106 flows air along paths corresponding with the size and the weight of the occupant seated on the vehicle seat assembly 100. In particular, the flow control layer 106 comprises a first support area 180 that defines a first plurality of slits 122 and a second support area 182, which is adjacent to the first support area 180 and defines a second plurality of slits 124. In this embodiment, the second support area 182 includes two sections 184, 186 disposed on opposite sides 188, 190 of the first support area 180. However, the second support area can include more or fewer sections and have other spatial arrangements with respect to the first support area. Each one of the slits 122, 124 has a pair of opposing edges 192, 194 defining a width therebetween, with the width being moveable between a restricted position (FIG. 7) and a free-flowing position (FIG. 8).

As shown in FIG. 3, the width of the first plurality of slits 122 can move to the free-flowing position while the width of the second plurality of slits 124 remains in the restricted positions when the first support area 180 receives a first load corresponding with the size and weight of a first occupant. In this way, air flows toward, away from, or immediately adjacent to the first occupant 196 and through the first plurality of slits 122 and the passage 116 of the bottom cushion 114 for efficiently providing ventilation for the first occupant. At the same time, the second plurality of slits 124 remain in the restricted position to reduce the amount of air flowing through the second plurality of slits 124 and along directions which do not communicate with the first occupant 196 and thus do not provide direct ventilation about the first occupant 196. While opposing edges 192, 194 of each slit 124 are spaced apart from one another in a narrowed position, the edges 192, 194 are spaced apart from one another by a distance that is shorter than the distance separating the opposing edges 192, 194 when the widths are moved to the free-flowing positions.

As shown in FIG. 4, the width of the second plurality of slits 124 can move to the free-flowing position when the second support area 182 receives a second load corresponding with a second occupant 198, who may be wider and heavier than the first occupant 196. In this respect, air can flow toward, away from, or immediately adjacent to the second occupant 198 and through the second plurality of slits 124 of the flow control layer 106 and the passage 116 of the bottom cushion 114. Thus, the flow control layer 106 selectively moves the width of slits 122, 124 between the restricted position and the free-flowing position to flow air along paths that provide direct ventilation about various occupants having different sizes and weights.

Figure 5:
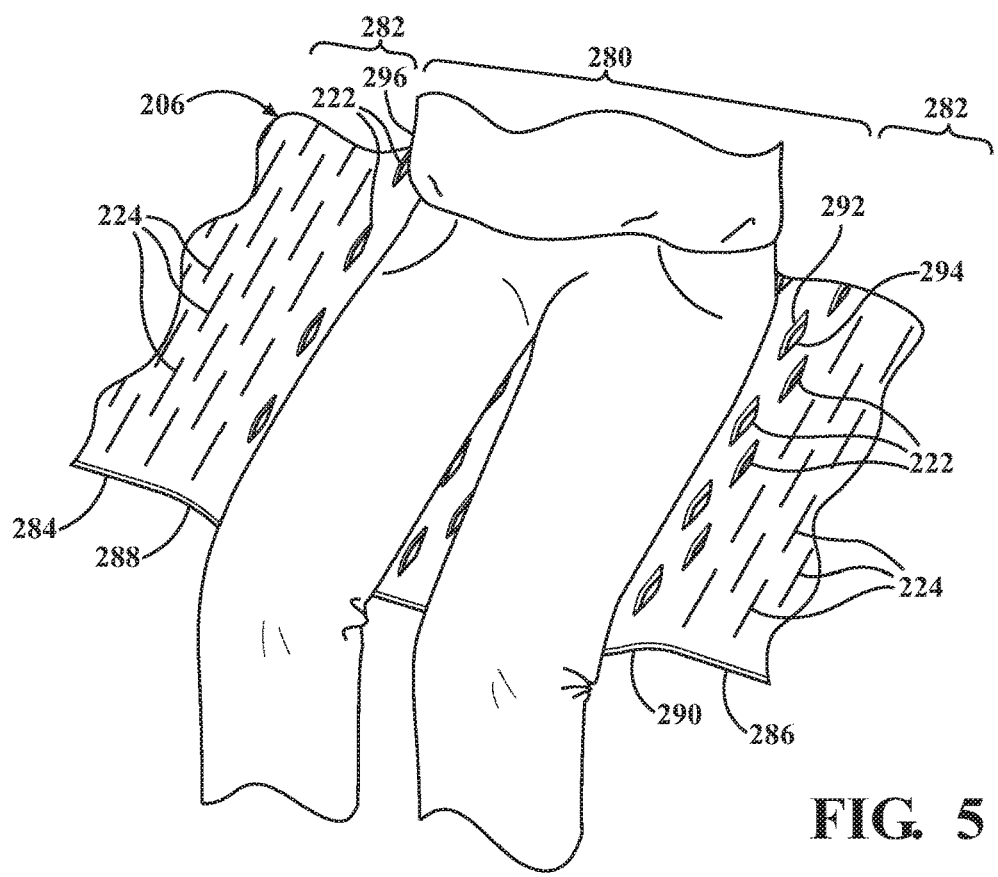
FIG. 5 is a perspective cutaway view of another embodiment of the flow control layer shown in FIG. 3, with the second plurality of slits not remaining in restricted positions but rather remaining in fully closed positions.
Figure 6:
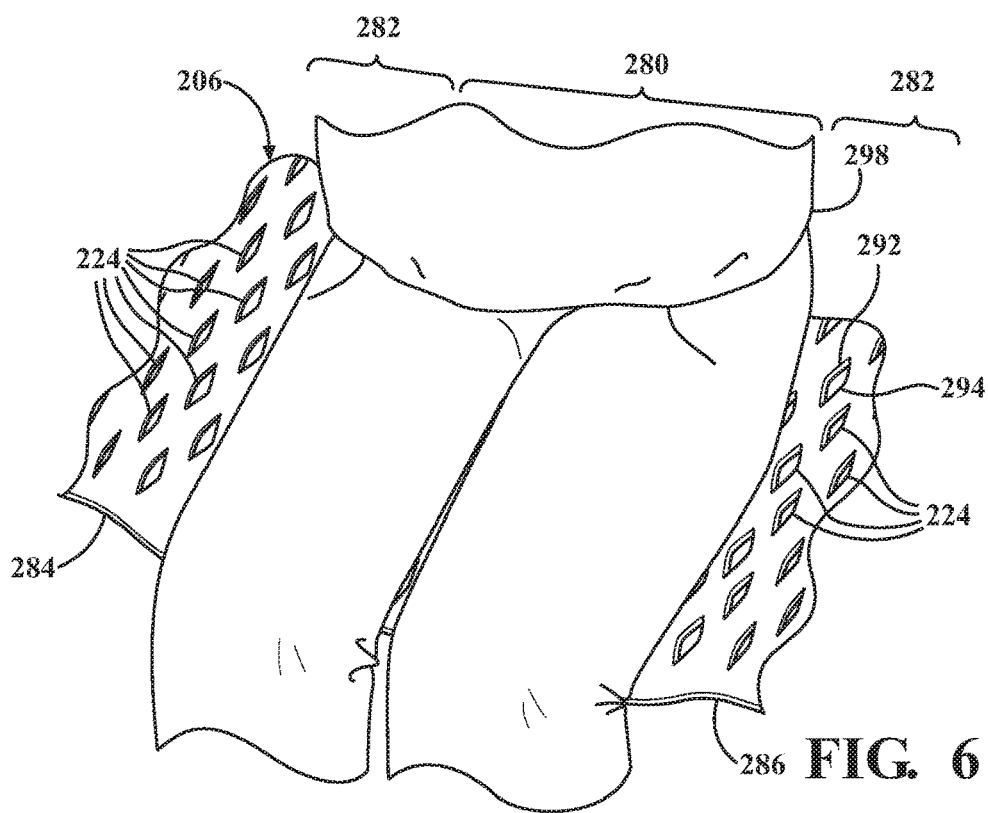
FIG. 6 is a perspective cutaway view of the portion of flow control layer of FIG. 5, illustrating that the second plurality of slits can move to free-flowing position when the second support area receives a second load corresponding with a second occupant, who is wider than the first occupant.

Referring to FIGS. 5 and 6, another embodiment of the flow control layer 206 is similar to the flow control layer 106 of FIGS. 3 and 4, and the flow control layer 206 includes similar or corresponding components identified by the same reference numbers increased by 100. In particular, while the width of each one of the first plurality of slits 122 and the second plurality of slits 124 of FIGS. 3 and 4 is moveable to the restricted position, the width of each one of the first plurality of slits 222 and the second plurality of slits 224 of FIGS. 5 and 6 is moveable to a fully closed position such that the opposing edges of each slit 222, 224 abut one another so as to re-direct airflow through any other slits that are not moved to the fully closed position. As one example, with reference to FIG. 5, the width of the second plurality of slits 224 in the second support area 282 remain in the fully closed position when the first support area 280 receives a first load corresponding with a first occupant 296. Thus, the flow control layer 206 of FIG. 5 can flow all of the air through the first plurality of slits 222 having their widths moved to the free-flowing position, as compared to the flow control layer 106 of FIG. 3 that directs one air flow through the first plurality of slits 122 having their widths moved to the free-flowing position and a smaller air flow through the second plurality of slits 124 having widths remaining in the restricted position.

Referring to FIGS. 7-10, the slits can be arranged in any suitable pattern to define load paths disposed about the slits 122, 124 in a serpentine configuration (FIGS. 7 and 8) or a linear configuration (FIGS. 9 and 10) so as to facilitate with moving the width of certain slits to the free-flowing position when the flow control layer receives the first load or the second load.

Figure 7:
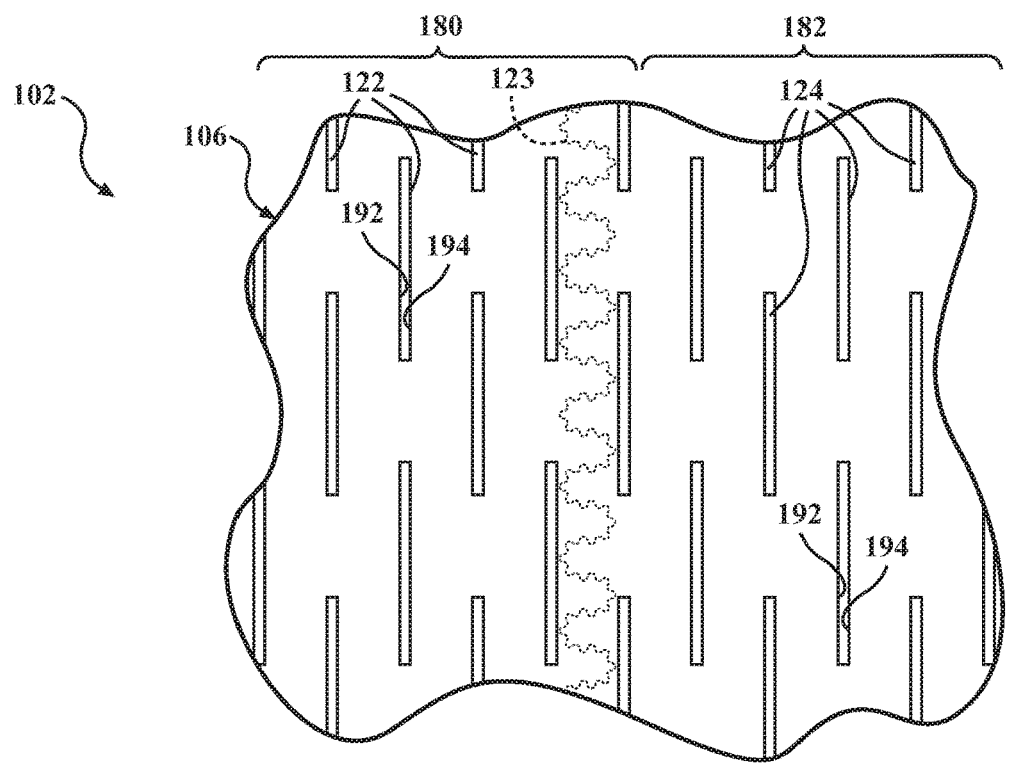
FIG. 7 is an enlarged plan view of a portion of flow control layer of FIG. 3, illustrating that the first plurality of slits and the second plurality of slits are arranged in a staggered pattern and remain in the restricted position.
Figure 8:
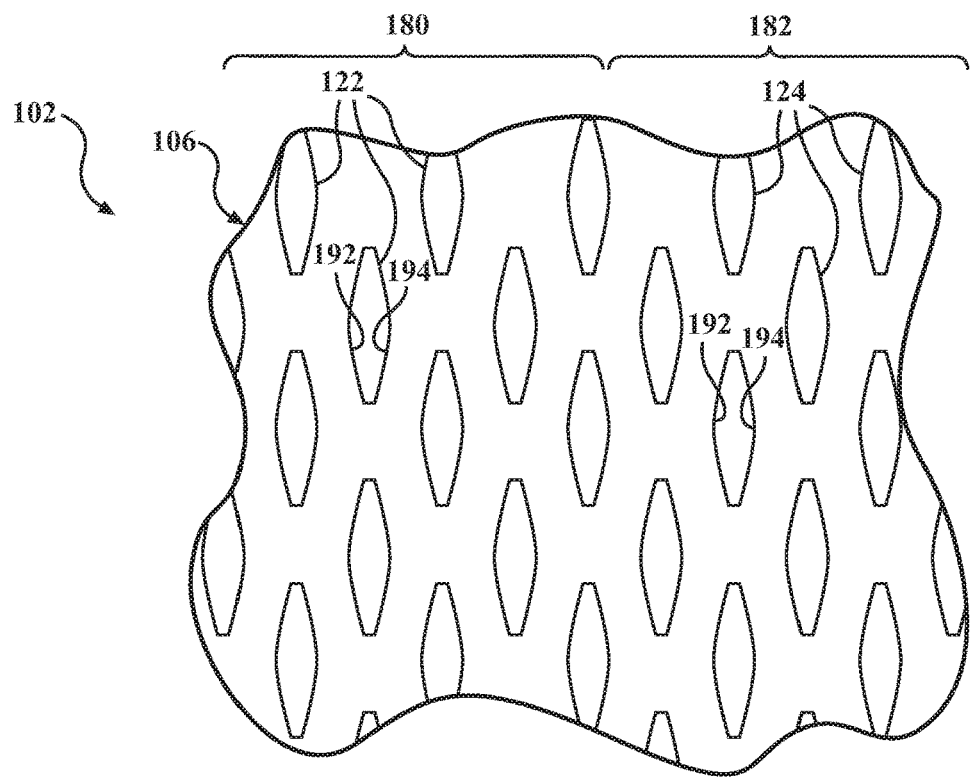
FIG. 8 is an enlarged plan view of the portion of flow control layer of FIG. 7, illustrating that the first plurality of slits and the second plurality of slits can move to free-flowing positions when the first and second support areas receive corresponding first and second loads.

Referring to FIGS. 7 and 8, the flow control layer 106 includes a first support area 180 with the first plurality of slits 122 arranged in a staggered pattern, such that the first support area 180 can receive a serpentine load disposed about the first plurality of slits 122 to open the same and permit air to flow through at least a portion of the first plurality of slits 122. The second support area 182 includes a second plurality of slits 124 arranged in a staggered pattern, such that the second support area 182 can receive a serpentine load disposed about the second plurality of slits 124 to open the same and permit air to flow through at least a portion of the second plurality of slits 124.

FIG. 7 shows one portion of one heating element 123 coupled to the flow control layer 106. The flow control layer 106 can include any number of heating elements coupled to any portions of the flow control layer 106. The heating elements 123 can be a heat resistive element or other device that produces heat in response to receiving an electrical current. The heating elements can be coupled to a power source (not shown) by a switch (not shown) for selectively providing heat to a vehicle occupant received on the seat.

Figure 9:
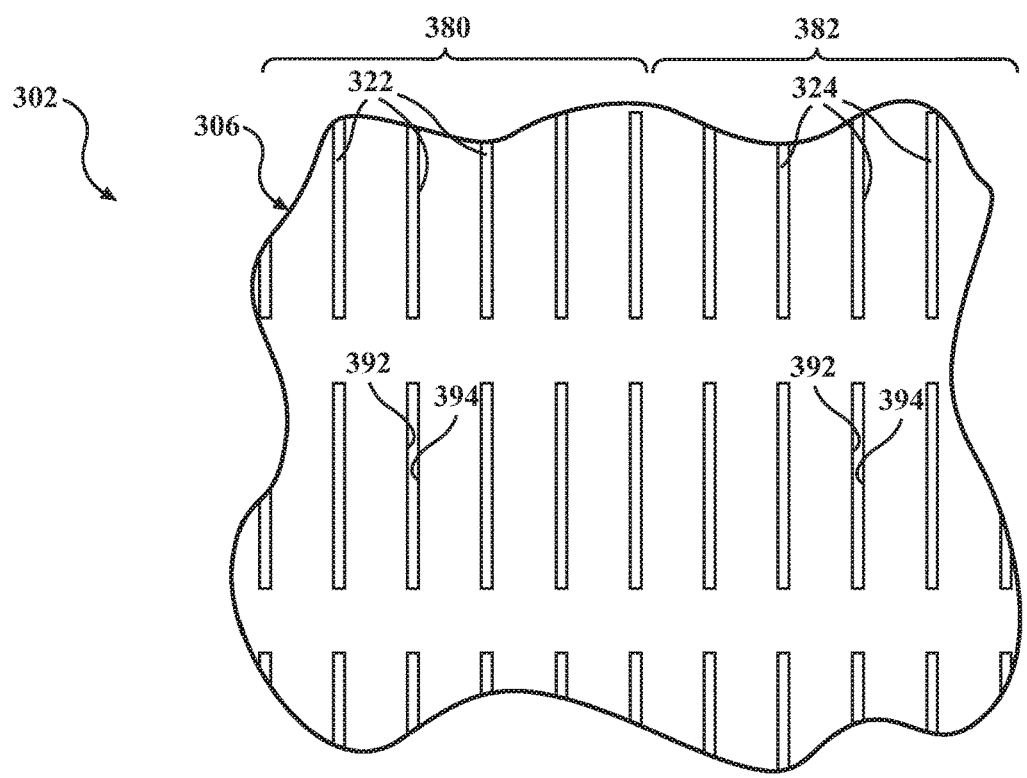
FIG. 9 is an enlarged plan view of another embodiment of a flow control layer, illustrating that the flow control layer comprises first and second support areas defining a corresponding one of a first plurality of slits and a second plurality of slits arranged in a plurality of linear rows spaced apart from one another, with each one of the slits remaining in a restricted position.
Figure 10:
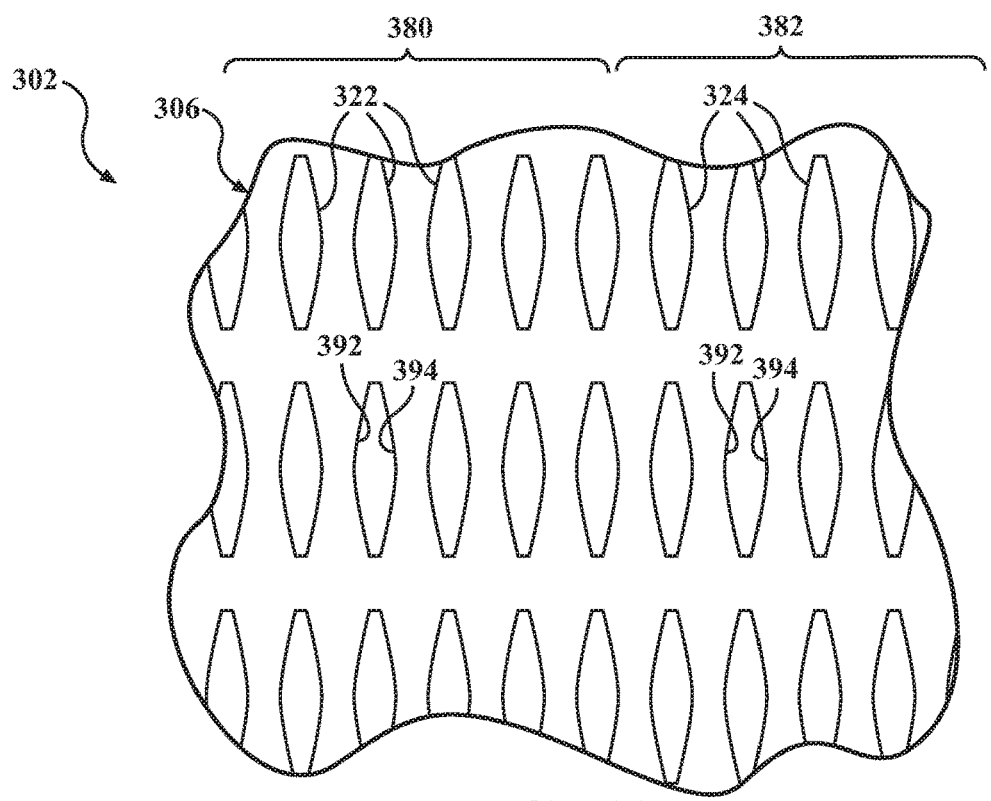
FIG. 10 is an enlarged plan view of the portion of flow control layer of FIG. 9, illustrating that the first plurality of slits and the second plurality of slits can move to the free-flowing position when the first and second support areas receive corresponding first and second loads.

Referring to FIGS. 9 and 10, another embodiment of a flow control layer 306 can be similar to the flow control layer 106 of FIGS. 7 and 8, and thus the flow control layer 306 can comprise similar or corresponding components identified by the same reference numbers increased by 200. However, the first support area 380 can include a first plurality of slits 322 that are not arranged in a staggered pattern but rather are arranged in a plurality of linear rows spaced apart from one another. In this way, the first support area 380 can receive a linear load between corresponding adjacent pairs of the linear rows to open the slits 322 and permit air to flow through at least a portion of the first plurality of slits 322 when a first occupant is seated in the vehicle seat assembly. Moreover, the second support area 382 can include a second plurality of slits 324 arranged in a plurality of linear rows that are co-linear with and extend from a corresponding one of the linear rows of the first plurality of slits 322 in the first support area 380. The second plurality of slits 324 can be arranged in a plurality of linear rows spaced apart from one another, such that the second support area 382 can receive a linear load between corresponding adjacent pairs of the linear rows to open the slits 324 and permit air to flow through at least a portion of those slits 324, who is wider and heavier than the first occupant, is seated on the vehicle seat assembly.

Referring to FIGS. 11-14, other exemplary embodiments of the flow control layer can include stitch seams that are load paths extending across the first and second support areas to facilitate with moving certain slits to the free-flowing position when the flow control layer receives the first load or the second load.

Figure 11:
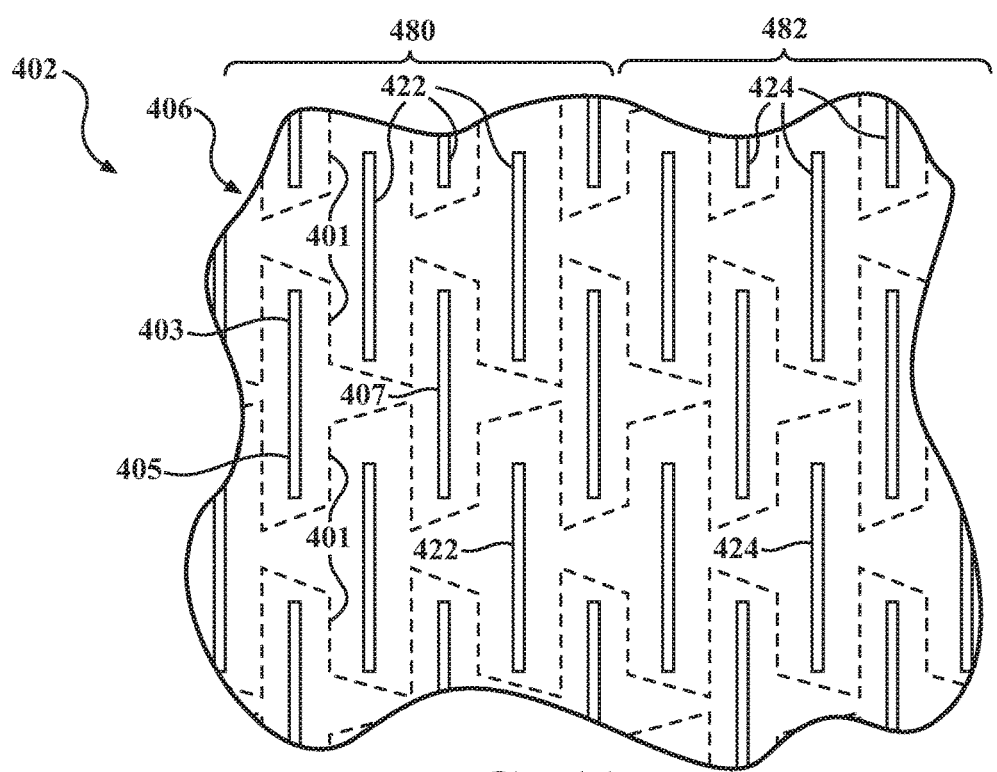
FIG. 11 is an enlarged view of yet another embodiment of the flow control layer of FIG. 7, illustrating that the flow control layer can have a plurality of stitch seams that define load paths disposed about the first plurality of slits and the second plurality of slits.
Figure 12:
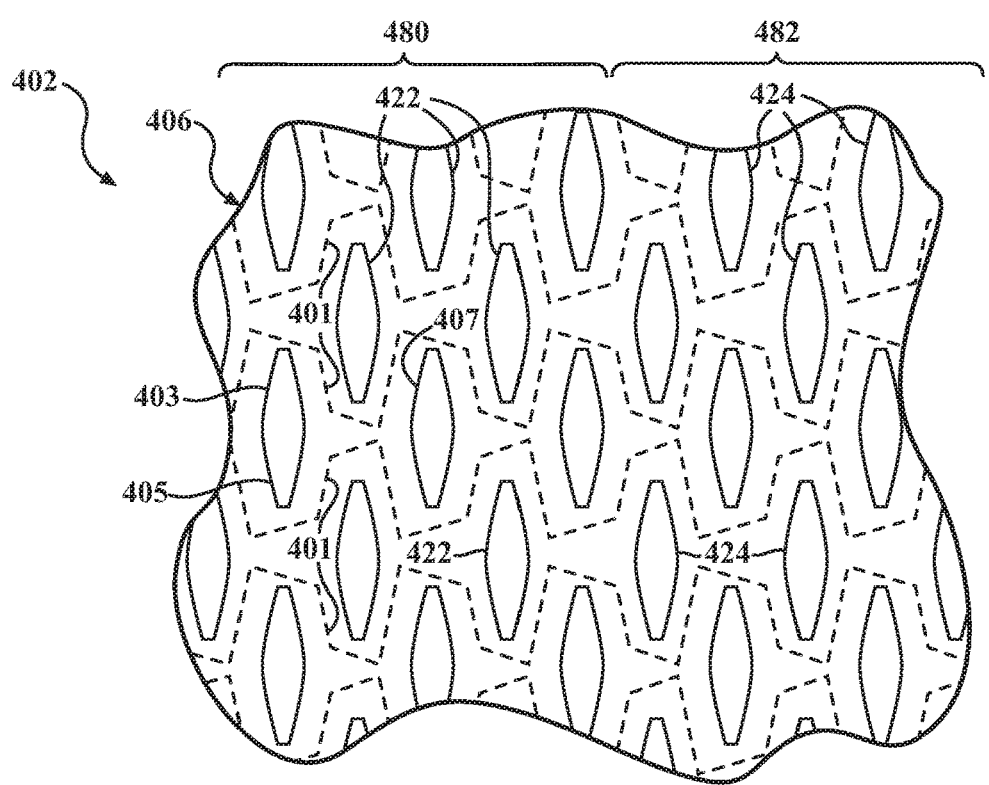
FIG. 12 is an enlarged view of the flow control layer of FIG. 11, illustrating that the stitch seams can move the first plurality of slits and second plurality of slits to the free-flowing position when the first and second support areas receive corresponding first and second loads.

In particular, referring to FIGS. 11 and 12, yet another embodiment of a flow control layer 406 is similar to the flow control layer 106 of FIGS. 7 and 8, and the flow control layer 406 includes similar or corresponding components identified by the same reference numbers increased by 300. However, in this embodiment, the flow control layer 406 further includes a plurality of stitch seams 401 for moving the width of the first plurality of slits 422 and the second plurality of slits 424 from the restricted position to the free-flowing position. In particular, the stitch seams 401 define at least one load path in the first support area 480 such that the stitch seams 401 move corresponding ones of the first plurality of slits 422 to the free-flowing position when the first support area 480 receives a first load corresponding with the first occupant. Furthermore, the stitch seams 401 define at least one load path in the second support area 482 such that the stitch seams 401 move corresponding ones of the second plurality of slits 424 to the free-flowing position when the second support area 482 receives a second load corresponding with the second occupant, who is wider and heavier than the first occupant.

To permit the stitch seams 401 to control the deformation of the flow control layer 406 and open the slits, each one of the stitch seams 401 can have a first modulus of elasticity, and the first and second support areas 460, 462 can have a second modulus of elasticity that is greater than the first modulus of elasticity. As shown in FIG. 11, the first plurality of slits 422 and the second plurality of slits 424 are arranged in a staggered pattern, and each one of the slits 422, 424 has a pair of opposing ends 403, 405 and a center portion 407 therebetween, with the stitch seams 401 arranged in a pattern to facilitate moving the width of the slits 422, 424 to the free-flowing position by using the stitch seams 401 to couple the ends 403, 405 of each slit to the center portion 407 of an another slit.

Figure 13:
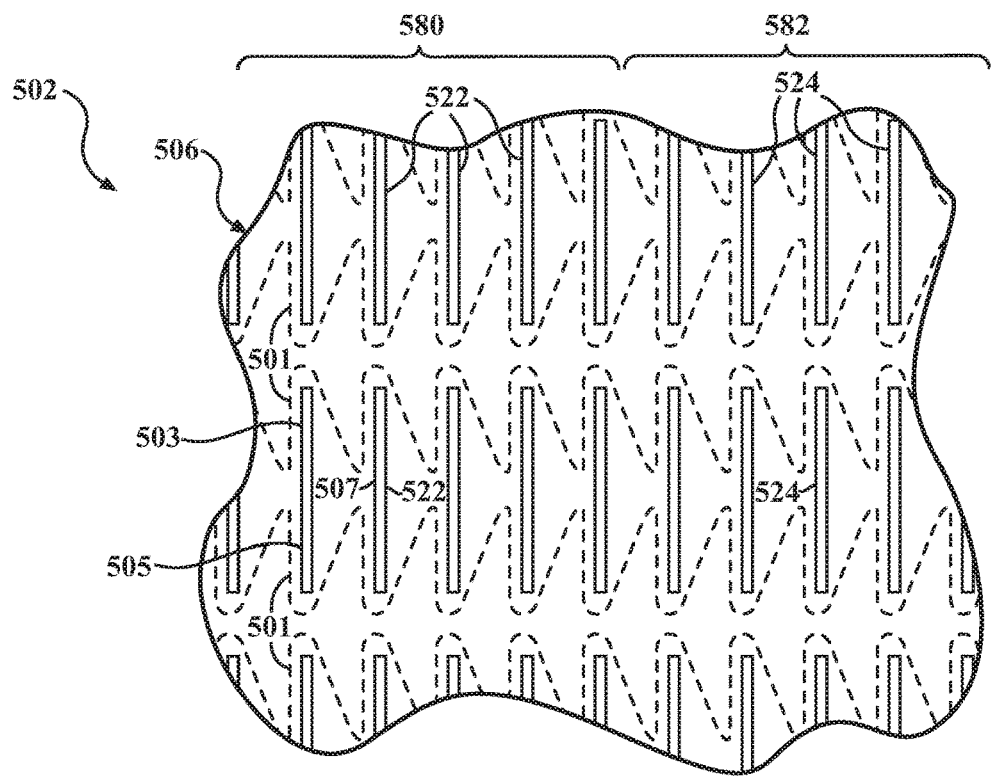
FIG. 13 is an enlarged view of still another embodiment of the flow control layer of FIG. 9, illustrating that the flow control layer can have a plurality of stitch seams that define load paths disposed about the first plurality of slits and the second plurality of slits.
Figure 14:
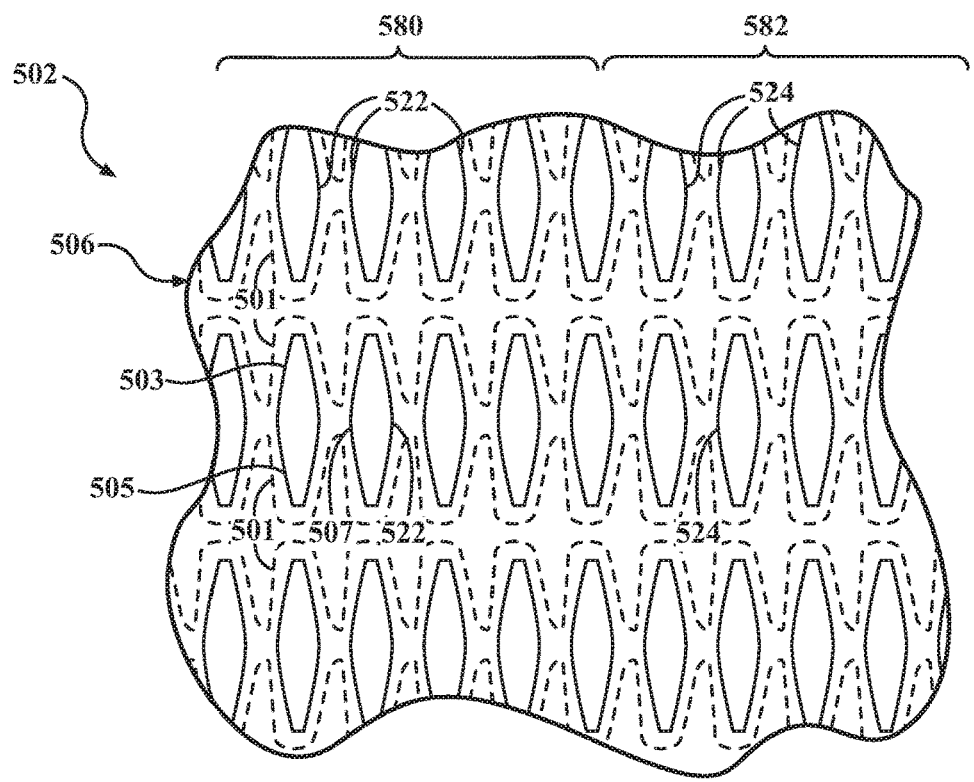
FIG. 14 is an enlarged view of the flow control layer of FIG. 13, illustrating that the stitch seams can move the first plurality of slits and second plurality of slits to the free-flowing position when the first and second support areas receive corresponding first and second loads.

Referring to FIGS. 13 and 14, yet another embodiment of a flow control layer 506 is similar to the flow control layer 406 of FIGS. 11 and 12, and the flow control layer 506 includes similar or corresponding components identified by the same reference numbers increased by 100. However, while the flow control layer 406 of FIGS. 11 and 12 defines slits 422, 424 arranged in a staggered pattern, the flow control layer 506 of FIGS. 13 and 14 defines slits 522, 524 arranged in a plurality of linear rows spaced apart from one another.

It is contemplated that the flow control layer can have any number of slits that are linear, curved, or non-linear stand-alone slits, or a plurality of slits intersecting one another. Also, the slits may be openings that do not fully close, and they may be arranged in a staggered pattern, linear rows, or any other uniform or non-uniform pattern.

The present inventions have been described herein in an illustrative manner, and it is to be understood that the terminology which has been used is intended to be in the nature of words of description rather than of limitation. Many modifications and variations of the present inventions are possible in light of the above teachings. The inventions may be practiced otherwise than as specifically described within the scope of the appended claims.

What is claimed is:
1. A vehicle seat assembly comprising:
a seat bottom having a bottom cushion;
a seat back coupled to said seat bottom with said seat back having a back cushion;
at least one of said bottom cushion and said back cushion having a passage; and
a flow control layer coupled to said cushion having said passage with said flow control layer defining a first support area having a first plurality of slits and a second support area, adjacent to said first support area, having a second plurality of slits, with each one of said first plurality of slits and said second plurality of slits having a pair of opposing edges defining a width therebetween, with said width of said first plurality of slits and said second plurality of slits being moveable between a restricted position and a free-flowing position, and said width of said first plurality of slits moving to said free-flowing position while said width of said second plurality of slits remains in said restricted position when said first support area receives a first load for flowing air through said first plurality of slits and said passage.

2. The vehicle seat assembly of claim 1 wherein said first plurality of slits is arranged in a staggered pattern such that said first support area can receive a serpentine load disposed about said first plurality of slits and continues to permit air to flow through at least a portion of said first plurality of slits.

3. The vehicle seat assembly of claim 1 wherein said first plurality of slits is arranged in a plurality of linear rows spaced apart from one another such that said first support area can receive a linear load disposed between corresponding adjacent pairs of said plurality of linear rows and continues to permit air to flow through at least a portion of said first plurality of slits.

4. The vehicle seat assembly of claim 1 wherein said first support area defines at least one load path disposed about said first plurality of slits with each one of said first plurality of slits having a pair of opposing ends and a center portion therebetween.

5. The vehicle seat assembly of claim 4 wherein said first support area further comprises a plurality of stitch seams that define said at least one load path such that said plurality of stitch seams move corresponding ones of said first plurality of slits to said free-flowing position when said first support area receives said first load.

6. The vehicle seat assembly of claim 5 wherein each one of said plurality of stitch seams has a first modulus of elasticity and said first support area has a second modulus of elasticity that is greater than said first modulus of elasticity.

7. The vehicle seat assembly of claim 6 wherein said at least one load path has one of a serpentine configuration about said first plurality of slits and a linear configuration adjacent to said first plurality of slits.

8. The vehicle seat assembly of claim 1 wherein said width of said second plurality of slits moves to said free-flowing position when said second support area receives a second load for flowing air through said second plurality of slits and said passage.

9. The vehicle seat assembly of claim 8 wherein said second plurality of slits is arranged in a staggered pattern such that said second support area can receive a serpentine load disposed about said second plurality of slits and permits air to flow through at least a portion of said first plurality of slits.

10. The vehicle seat assembly of claim 8 wherein said second plurality of slits is arranged in a plurality of linear rows spaced apart from one another such that said second support area can receive a linear load path between corresponding adjacent pairs of said plurality of linear rows and permits air to flow through at least a portion of said first plurality of slits.

11. The vehicle seat assembly of claim 8 wherein said second support area defines at least one load path disposed about said second plurality of slits with each one of said second plurality of slits having a pair of opposing ends and a center portion therebetween.

12. The vehicle seat assembly of claim 11 wherein said second support area further comprises a plurality of stitch seams define said at least one load path such that said plurality of stitch seams move corresponding ones of said second plurality of slits to said free-flowing position when said second support area receives said second load.

13. The vehicle seat assembly of claim 12 wherein each one of said plurality of stitch seams has a first modulus of elasticity and said second support area has a second modulus of elasticity that is greater than said second modulus of elasticity.

14. The vehicle seat assembly of claim 13 wherein said at least one load path has one of a serpentine configuration about said second plurality of slits and a linear configuration adjacent to said second plurality of slits.

15. The vehicle seat assembly of claim 1 wherein each one of said bottom cushion and said back cushion comprises a foam padding.

16. The vehicle seat assembly of claim 1 further comprising at least one spacer mesh fluidly communicating with at least a portion of said first plurality of slits and said second plurality of slits.

17. The vehicle seat assembly of claim 16 wherein each one of said bottom cushion and said back cushion has a pair of opposing sides, and said at least spacer mesh is disposed on at least one of said pair of opposing sides.

18. The vehicle seat assembly of claim 1 further comprising a fan fluidly communicating with said first plurality of slits for generating a flow of air through said first plurality of slits.

19. The vehicle seat assembly of claim 18 further comprising at least one conduit having one end fluidly communicating with said fan and an opposing end fluidly communicating with said passage of at least one of said back cushion and said bottom cushion for directing said flow of air.

20. The vehicle seat assembly of claim 19 wherein said flow control layer, said fan, and said at least one conduit form a ventilation device mounted about at least one of said back cushion and said bottom cushion.

21. The vehicle seat assembly of claim 1 further comprising a fan fluidly communicating with said second plurality of slits for generating the flow of air through said second plurality of slits.

22. The vehicle seat assembly of claim 1 wherein said width of said second plurality of slits in said restricted position is further defined as a closed position with said opposing edges of corresponding ones of said second plurality of slits abutting one another.

23. The vehicle seat assembly of claim 1 wherein said width of said second plurality of slits in said restricted position is further defined as a narrowed position with said opposing edges of corresponding ones of said second plurality of slits being closer together than said opposing edges of corresponding ones of said first plurality of slits, wherein said first plurality of slits are in said free-flowing position.

24. The vehicle seat assembly of claim 1 further comprising a frame with said seat bottom and said seat back coupled to said frame.

25. The vehicle seat assembly of claim 1 further comprising a seat cover coupled to at least one of said seat back and said seat bottom disposed over said corresponding cushion, with said seat cover comprising a permeable material fluidly communicating with said first plurality of slits.

26. A ventilation device for use in a vehicle seat assembly that comprises a seat bottom having a bottom cushion and a seat back coupled to said seat bottom with said seat back having a back cushion, and at least one of said bottom cushion and said back cushion having a passage, said ventilation device comprising:

a flow control layer defining a first support area having a first plurality of slits and a second support area, adjacent to said first support area, having a second plurality of slits, with each one of said first plurality of slits and said second plurality of slits having a pair of opposing edges defining a width therebetween, with said width of said first plurality of slits and said second plurality of slits being moveable between a restricted position and a free-flowing position, and said width of said first plurality of slits moving to said free-flowing position while said width of said second plurality of slits remains in said restricted position when said first support area receives a first load for flowing air through said first plurality of slits and said passage;

a fan fluidly communicating with said first plurality of slits for generating a flow of air through said first plurality of slits; and a conduit having one end fluidly communicating with said fan and an opposing end for fluidly communicating with the passage of at least one of the back cushion and the bottom cushion for directing said flow of air.

* * * * *